(12) United States Patent
Kottapalli et al.

(10) Patent No.: US 7,181,590 B2
(45) Date of Patent: Feb. 20, 2007

(54) METHOD FOR PAGE SHARING IN A PROCESSOR WITH MULTIPLE THREADS AND PRE-VALIDATED CACHES

(75) Inventors: Sailesh Kottapalli, San Jose, CA (US); Nadeem H. Firasta, Mt. View, CA (US)

(73) Assignee: Intel Corporation, Santa Clara, CA (US)

(*) Notice: Subject to any disclaimer, the term of this patent is extended or adjusted under 35 U.S.C. 154(b) by 404 days.

(21) Appl. No.: 10/650,335

(22) Filed: Aug. 28, 2003

(65) Prior Publication Data

US 2005/0050296 A1    Mar. 3, 2005

(51) Int. Cl.
*G06F 12/10* (2006.01)

(52) U.S. Cl. ............... 711/207; 712/215; 711/206; 711/203

(58) Field of Classification Search ............... None
See application file for complete search history.

(56) References Cited

U.S. PATENT DOCUMENTS

| | | | | |
|---|---|---|---|---|
| 5,265,227 A | * | 11/1993 | Kohn et al. ............... 711/207 |
| 5,319,761 A | * | 6/1994 | Chiarot et al. ............ 711/207 |
| 5,341,485 A | * | 8/1994 | Hattersley et al. ........ 711/207 |
| 6,138,226 A | * | 10/2000 | Yoshioka et al. .......... 711/210 |
| 6,324,634 B1 | * | 11/2001 | Yoshioka et al. .......... 711/205 |
| 6,662,280 B1 | * | 12/2003 | Hughes .................... 711/156 |
| 2002/0184430 A1 | * | 12/2002 | Ukai et al. .................. 711/3 |

* cited by examiner

*Primary Examiner*—B. James Peikari
(74) *Attorney, Agent, or Firm*—Kenyon & Kenyon LLP

(57) ABSTRACT

A method and system for allowing a multi-threaded processor to share pages across different threads in a pre-validated cache using a translation look-aside buffer is disclosed. The multi-threaded processor searches a translation look-aside buffer in an attempt to match a virtual memory address. If no matching valid virtual memory address is found, a new translation is retrieved and the translation look-aside buffer is searched for a matching physical memory address. If a matching physical memory address is found, the old translation is overwritten with a new translation. The multi-threaded processor may execute switch on event multi-threading or simultaneous multi-threading. If simultaneous multi-threading is executed, then access rights for each thread is associated with the translation.

34 Claims, 3 Drawing Sheets

METHOD FOR PAGE SHARING IN A PROCESSOR WITH MULTIPLE THREADS AND PRE-VALIDATED CACHES

BACKGROUND OF THE INVENTION

The present invention pertains to a method and apparatus for page sharing in a multithreaded processor. More particularly, the present invention pertains to the maintenance of a translation look-aside buffer with pre-validation of physical addresses.

As is known in the art, a translation look-aside buffer (TLB) is used to map a virtual memory address to a physical memory address. A programming thread, executed by a processor, initiates a read or update to a physical memory address by providing a virtual address. The processor searches the TLB for the virtual address, retrieves the physical address, and computes the physical address tag for a given cache. The physical address tag for the matching index is retrieved from the cache. A full comparison is executed between the tag of the request and the cache tag. If the cache tag matches the request tag, the search is registered as a hit. If the cache tag does not match the request tag, the search is registered as a miss. The full comparison of the tags and the full retrieval of the physical address from the TLB require a great deal of processor time.

Problems begin to occur when more than one thread is supported in the processor core. Two threads using the same virtual and physical page would require different TLB entries to support different page "access" rights. This defeats the ability to share common memory contents between threads since each thread requires the presence of its own translation entry in the TLB. Thus a request to a line from one thread is unable to get a cache-hit on a line cached by a different thread.

DETAILED DESCRIPTION OF THE DRAWINGS

A method and system for allowing a multi-threaded processor to use a translation look-aside buffer (TLB) and a cache with pre-validated tags are described herein. The multi-threaded processor may search a translation look-aside buffer in an attempt to match a virtual memory address. If no matching valid virtual memory address is found, the processor retrieves the appropriate translation from the next level TLB or virtual hash page table (VHPT). During insertion, the translation look-aside buffer may be searched for a matching physical memory address. If a matching physical memory address is found, the associated virtual memory address may be overwritten with a new virtual memory address. The multi-threaded processor may execute switch on event multi-threading or simultaneous multi-threading. If simultaneous multi-threading is executed, then access rights for each thread may be associated with the translation.

One method of speeding up the retrieval process is the use of 1-hot vectors. In general, a cache that stores 1-hot vectors as tags is referred to as a 1-hot cache tag. A 1-hot vector is an n-bit string that contains a single "1" and n-1 "0's", for example, "00001000" is an eight-bit 1-hot vector. The 1-hot vector has the same number of bits as the number of entries in the TLB. When a line is cached, instead of tagging the line with the conventional tag, the line is tagged with the 1-hot vector that points to the TLB entry that contains the translation for the physical address corresponding to the line. When a memory request, with a virtual address, searches the TLB, the content addressable memory (CAM) lookup of the virtual addresses of all translations stored in the TLB returns a 1-hot match vector pointing to the entry that contains the translation for the request. The 1-hot vector corresponding to the index portion of the memory request is retrieved from the 1-hot cache tag. The 1-hot vector generated from the TLB match for the request and the 1-hot vector corresponding to the request index of the 1-hot cache tag is compared using an AND-OR operation on each bit. A "true" result indicates a cache hit. A "false" result indicates a cache miss.

The 1-hot scheme requires that no two different virtual addresses, or "synonyms", be mapped to the same physical address in the TLB. This is because the cache tag is generated using the physical address CAM on the TLB during cache fill while the tag for the memory request is generated on the CAM match on the virtual address of the TLB. Therefore, each physical address mapping in the TLB must be unique. To support this, a "column clear" needs to be executed on the 1-hot vector in the cache tag each time a new entry is added (and the old one replaced) in the TLB. The column clear removes the possibility of cache hit for lines mapping to the physical address translation provided by the old (replaced) translation.

Figure 1:
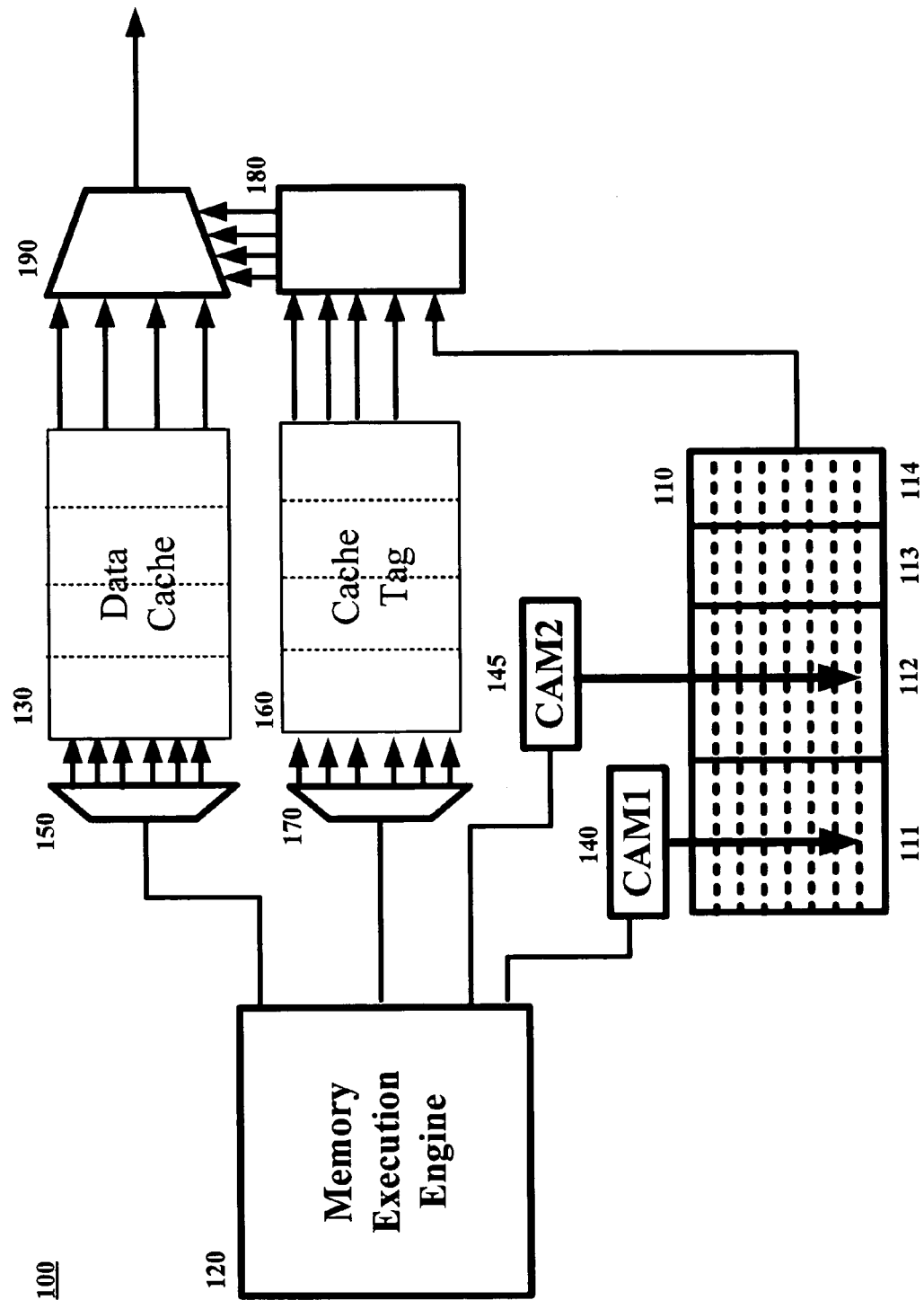
FIG. 1 is a block diagram of a portion of a processor employing an embodiment of the present invention.

FIG. 1 illustrates in a block diagram one embodiment of a processor 100 using the TLB 110. The processor may execute a memory instruction using a memory execution engine 120. The processor may be a multithreaded processor, capable of running multiple programming threads. The multiple programming threads may be executed using either simultaneous multi-threading (SMT) or switch on event multi threading (SoEMT). In SMT, the multiple programming threads may be executed concurrently. In SoEMT, the multiple programming threads may be executed in an alternating fashion. A first thread is executed until an event occurs, such as a long latency stall, after which the processor moves the active thread to the background and switches to an inactive thread.

The TLB 110 may be configured to store a number of translations, each translation containing a virtual memory address 111 and physical memory address 112. If the multi-threaded processor 100 uses SMT, a first set of access rights 113 may be stored in the TLB 110 and associated with the translation. The first set of access rights 113 may refer to the ability of a first programming thread to execute an operation using the data stored at that physical memory address 112. The operations may include "read", "write", "execute", or other processing operations. A second set of access rights 114 may be stored in the TLB 110 and associated with the same translation. The second set of access rights 114 may refer to the ability of a second programming thread to execute an operation using the data stored at that physical memory address 112. If the second programming thread uses a different translation for the physical memory address 112, the first set of access rights 114 are erased when the second programming thread overwrites that translation. If the multi-threaded processor 100 uses SoEMT, access rights for each thread may be stored in the TLB 110. However, as the threads in SoEMT have control of the TLB 110 for greater periods of time this is not as necessary.

The processor 100 may use the TLB 110 to access data in a data cache 130. The TLB 110 translates a virtual memory address 111 into a physical memory address 112 of the memory cache 130. The processor may use a first content address memory (CAM1) 140 to search the virtual memory addresses stored in the TLB 110. If the first CAM 140 is unable to find the virtual memory address 111, a miss may be returned and a new translation for the physical address 112 may be inserted into the TLB 110. For the insertion, the processor may use a second content address memory (CAM2) 145 to search the physical memory addresses 112 stored in the TLB 110.

The data cache may be divided into a number of ways. Data may be stored in any way of the cache-set matching the index of the address. Each address identifies a set as well as a byte within each cache line. The lower bits in both the virtual memory address 111 and the physical memory address 112 may indicate at which set and byte within a line the data is located. The remaining upper bits in the physical memory address may be the tag for that address. When a memory instruction is executed, a first de-multiplexer 150 may select the data at that particular set for each way. The data cache 130 may be associated with a cache tag 160. A second de-multiplexer 170 may select the tag in the cache tag 160 at that address for each way. A comparator 180 compares each tag from the cache tag 160 with the physical memory address 112 retrieved from the TLB 110 to determine which way, if any, has the matching tag. The comparator 180 signals a multiplexer 190, which receives the data at that address for each way, and sends on the data with the matching tag.

Alternatively, the cache tag 160 may contain a 1-hot vector associated with the position of the translation in the TLB 110 computed when the translation is inserted into the TLB 110. Upon retrieval of the data in the data cache 130, the 1-hot vector from the cache tag 160 is compared to the position of the translation in the TLB 110 to determine if the retrieved data is valid. The 1-hot vector allows the comparator 180 to be a simple AND-OR comparison of the stored 1-hot vectors and the position of the translation within the TLB 110. Additionally, if a new translation is inserted into the TLB 110 by overwriting a translation with the same physical address 112, the column clear of the cache tag 160 does not have to be performed as the 1-hot vector should still be valid.

Figure 2:
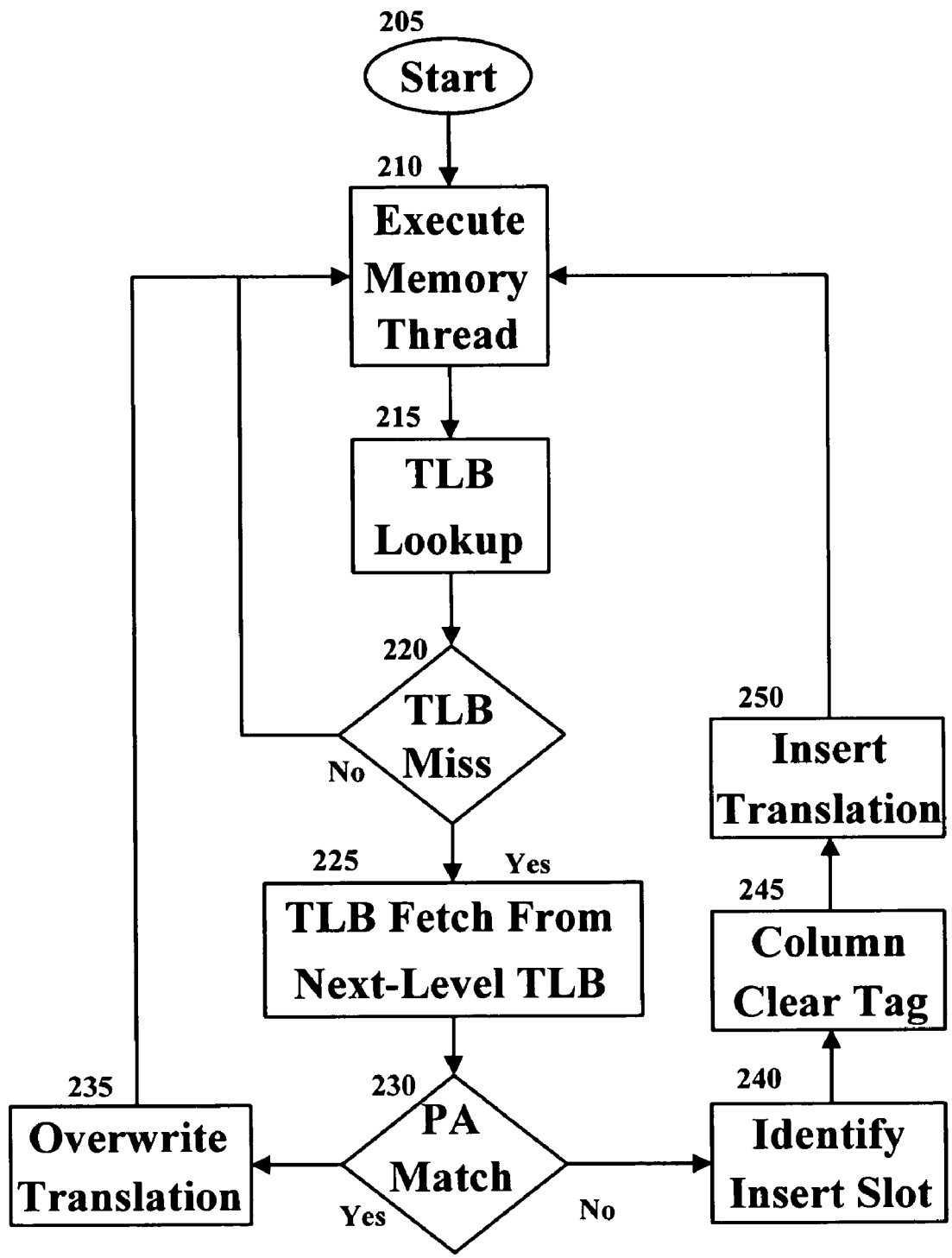
FIG. 2 is a flowchart showing an embodiment of a method according to the present invention.

FIG. 2 illustrates in a flowchart one embodiment of a method of replacing physical addresses within the TLB 110. The process may start (Block 205) by executing a first memory thread with a memory execution engine 120 (Block 210). The memory execution engine 120 may search the virtual memory addresses 111 of the TLB 110 for a virtual memory address that matches the virtual memory address of the thread using CAM1 140 (Block 215). If a valid virtual memory address is found (Block 220), the memory cache 130 at the physical memory address may be accessed and the next instruction of the first programming thread may be executed (Block 210). If no valid virtual memory address is found (Block 220), the proper translation may be retrieved from a second level TLB or VHPT (Block 225). The memory execution engine 120 may search the physical memory addresses 112 of the TLB 110 for a matching physical memory address using (Block 230). If a matching physical memory address 112 is found, the associated translation is overwritten by a new translation (Block 235). If no matching physical memory address 112 is found, a new slot within the TLB 110 is found in which to insert the new translation (Block 240). A column clear is executed upon the 1-hot vector to clear the 1-hot vector in the cache-tag indexing to the replaced translation (Block 245). The new translation is then inserted into the proper slot (Block 250). The memory execution engine 120 then executes the next instruction in the first memory thread (Block 210), or the second memory thread if a switch is called for.

Figure 3:
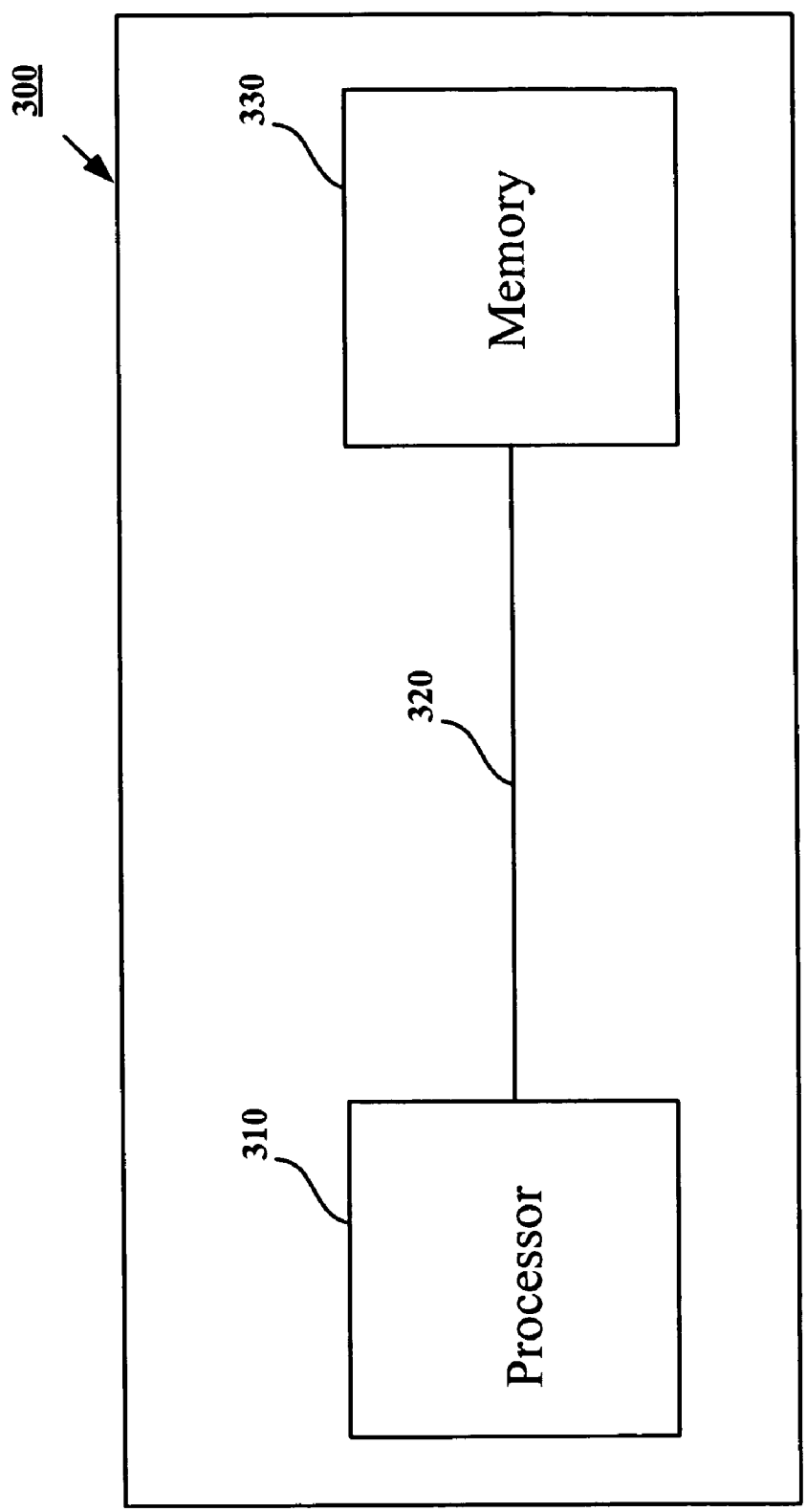
FIG. 3 provides an illustration of one embodiment of a processor system according to the present invention.

FIG. 3 shows a computer system 300 that may incorporate embodiments of the present invention. The system 300 may include, among other components, a processor 310, a memory 330 and a bus 320 coupling the processor 310 to memory 330. In this embodiment, processor 310 operates similarly to the processor 100 of FIG. 1 and executes instructions provided by memory 330 via bus 320.

Although a single embodiment is specifically illustrated and described herein, it will be appreciated that modifications and variations of the present invention are covered by the above teachings and within the purview of the appended claims without departing from the spirit and intended scope of the invention.

What is claimed is:

1. A method, comprising:
executing a first thread requiring a first valid virtual memory address representing a first physical memory address;
searching a translation look-aside buffer for the first valid virtual memory address;
retrieving a first translation upon failing to find the first valid virtual memory address;
searching the translation look-aside buffer for the first physical memory address; and
overwriting a second translation in the translation look-aside buffer corresponding to the first physical memory address with the first translation.

2. The method of claim 1, further comprising executing a second thread requiring a third translation corresponding to the first physical memory address.

3. The method of claim 2, wherein a multithreaded processor executes the first thread and the second thread.

4. The method of claim 3, wherein the multithreaded processor executes the first thread and the second thread using switch on event multithreaded processing.

5. The method of claim 3, wherein the multithreaded processor executes the first thread and the second thread using simultaneous multithreaded processing.

6. The method of claim 5 further comprising:
appending a first set of access rights for the first thread upon overwriting the second translation; and
appending a second set of access rights for the second thread upon overwriting the first translation.

7. The method of claim 6 further comprising:
erasing the first set of access rights if the third translation does not match the first translation.

8. The method of claim 7 wherein a content addressable memory is used to search the translation look-aside buffer.

9. The method of claim 1 further comprising:
creating a first one-hot index associated with the first physical memory address; and
validating the first valid virtual memory address using the first one-hot index.

10. A set of instructions residing in a storage medium, said set of instructions capable of being executed by a storage controller to implement a method for processing data, the method comprising:
executing a first thread requiring a first valid virtual memory address representing a first physical memory address;

searching a translation look-aside buffer for the first valid virtual memory address;
retrieving a first translation upon failing to find the first valid virtual memory address;
searching the translation look-aside buffer for the first physical memory address; and
overwriting a second translation in the translation look-aside buffer corresponding to the first physical memory address with the first translation.

11. The set of instructions of claim 10, further comprising executing a second thread requiring a third translation corresponding to the first physical memory address.

12. The set of instructions of claim 11, wherein a multi-threaded processor executes the first thread and the second thread.

13. The set of instructions of claim 12, wherein the multithreaded processor executes the first thread and the second thread using switch on event multithreaded processing.

14. The set of instructions of claim 12, wherein the multithreaded processor executes the first thread and the second thread using simultaneous multithreaded processing.

15. The set of instructions of claim 14, further comprising:
appending a first set of access rights for the first thread upon overwriting the second translation; and
appending a second set of access rights for the second thread upon overwriting the first translation.

16. The set of instructions of claim 15, further comprising:
erasing the first set of access rights if the third translation does not match the first translation.

17. The set of instructions of claim 16, wherein a content addressable memory is used to search the translation look-aside buffer.

18. The set of instructions of claim 10, further comprising:
creating a first one-hot index associated with the first physical memory address; and
validating the first valid virtual memory address using the first one-hot index.

19. A processor, comprising:
a translation look-aside buffer to store a first translation corresponding to a first physical memory address;
a memory execution engine to execute a first thread to search the translation look-aside buffer for the first physical memory address and to overwrite the first translation with a second translation corresponding to the first physical memory address.

20. The processor of claim 19, wherein the memory execution engine executes a second thread requiring a third translation corresponding to the first physical memory address.

21. The processor of claim 20, wherein the memory execution engine executes the first thread and the second thread using switch on event multithreaded processing.

22. The processor of claim 20, wherein the memory execution engine executes the first thread and the second thread using simultaneous multithreaded processing.

23. The processor of claim 22, wherein the memory execution engine appends a first set of access rights for the first thread upon overwriting the first translation; and appends a second set of access rights for the second thread upon overwriting the second translation.

24. The processor of claim 23, wherein the multithreaded processor erases the first set of access rights if the third translation does not match the second translation.

25. The processor of claim 19, further comprising a content addressable memory to search the translation look-aside buffer.

26. The processor of claim 19, wherein the translation look-aside buffer contains a first one-hot index associated with the first physical memory address to validate the first valid virtual memory address.

27. A system, comprising:
a memory unit with data stored at a first physical memory address; and
a processor coupled to said memory unit and including a translation look-aside buffer to store a first translation corresponding to the first physical memory address; and a memory execution engine to execute a first thread to search the translation look-aside buffer for the first physical memory address and to overwrite the first translation with a second translation corresponding to the first physical memory address.

28. The system of claim 27, wherein the memory execution engine executes a second thread requiring a third translation corresponding to the first physical memory address.

29. The system of claim 28, wherein the memory execution engine executes the first thread and the second thread using switch on event multithreaded processing.

30. The system of claim 28, wherein the memory execution engine executes the first thread and the second thread using simultaneous multithreaded processing.

31. The system of claim 30, wherein the memory execution engine appends a first set of access rights for the first thread upon overwriting the first translation; and appends a second set of access right for the second thread overwriting the second translation.

32. The system of claim 31, wherein the multithreaded processor erases the first set of access rights if the third translation does not match the second translation.

33. The system of claim 27, further comprising a content addressable memory to search the translation look-aside buffer.

34. The system of claim 27, wherein the translation look-aside buffer contains a first one-hot index associated with the first physical memory address to validate the first valid virtual memory address.

* * * * *